US009500077B2

(12) United States Patent
Li et al.

(10) Patent No.: US 9,500,077 B2
(45) Date of Patent: Nov. 22, 2016

(54) COMPREHENSIVE ADVANCED GEOLOGICAL DETECTION SYSTEM CARRIED ON TUNNEL BORING MACHINE

(71) Applicant: SHANDONG UNIVERSITY, JiNan, ShanDong Province (CN)

(72) Inventors: Shucai Li, JiNan (CN); Bin Liu, JiNan (CN); Lichao Nie, JiNan (CN); Yao Li, JiNan (CN); Xiangxue Ma, JiNan (CN); Jie Song, JiNan (CN); Zhengyu Liu, JiNan (CN); Huaifeng Sun, JiNan (CN); Chuanwu Wang, JiNan (CN); Xinji Xu, JiNan (CN); Lei Xu, JiNan (CN)

(73) Assignee: SHANDONG UNIVERSITY, Jinan (CN)

( * ) Notice: Subject to any disclaimer, the term of this patent is extended or adjusted under 35 U.S.C. 154(b) by 45 days.

(21) Appl. No.: 14/404,339

(22) PCT Filed: Jan. 26, 2014

(86) PCT No.: PCT/CN2014/000101
§ 371 (c)(1),
(2) Date: Nov. 26, 2014

(87) PCT Pub. No.: WO2015/103721
PCT Pub. Date: Jul. 16, 2015

(65) Prior Publication Data
US 2015/0233242 A1 Aug. 20, 2015

(30) Foreign Application Priority Data

Jan. 7, 2014 (CN) .......................... 2014 1 0007031
Jan. 7, 2014 (CN) ...................... 2014 2 0010073 U

(51) Int. Cl.
*G01S 13/88* (2006.01)
*E21D 9/00* (2006.01)
(Continued)

(52) U.S. Cl.
CPC ............. *E21D 9/003* (2013.01); *G01S 13/885* (2013.01); *G01V 1/288* (2013.01); *G01V 11/00* (2013.01)

(58) Field of Classification Search
CPC ..... E21D 9/003; G01S 13/885; G01V 1/288; G01V 11/00

USPC ............................................... 342/22; 367/14
See application file for complete search history.

(56) References Cited

U.S. PATENT DOCUMENTS 8,633,700 B1 * 1/2014 England .................. G01V 3/12
 324/348
2014/0333308 A1 11/2014 Li et al.

FOREIGN PATENT DOCUMENTS

CN 102768369 A 11/2012
CN 103076635 A 5/2013
(Continued)

OTHER PUBLICATIONS

Li et al., "New Achievements in Theory and Technology of Advanced Detection for Tunnel Water-Inrush Disaster-Causing Structures During Construction Period," *Proceedings of International Top-Level Forum on Engineering Science and Technology Development Strategy*, 2012, pp. 156-163 (with abstract).
(Continued)

*Primary Examiner* — Timothy A Brainard
(74) *Attorney, Agent, or Firm* — Oliff PLC

(57) ABSTRACT

The present invention presents a comprehensive advanced geological detection system carried on a tunnel boring machine. The comprehensive advanced geological detection system includes a multifunctional combination main frame, an induced polarization detection device, a seismic wave detection device, an integrated junction device, a borehole ground penetrating radar detection device and a comprehensive interpretation and decision system; the multifunctional combination main frame includes a time division multiplexing control module, an excitation source control module and a parallel data acquisition module; the excitation source control module outputs trigger signals to the three detection devices respectively, and the three detection devices respectively output measurement data and feedback signals to the time division multiplexing control module through the parallel data acquisition module; and the comprehensive interpretation and decision system supports geological interpretations and decisions through the inversion/migration imaging joint inversion of three detection methods.

10 Claims, 5 Drawing Sheets

(51) Int. Cl.
*G01V 1/28* (2006.01)
*G01V 11/00* (2006.01)

(56) References Cited

FOREIGN PATENT DOCUMENTS

| | | |
|---|---|---|
| CN | 203037864 U | 7/2013 |
| JP | B2-3404015 | 5/2003 |
| JP | A-2013-174580 | 9/2013 |

OTHER PUBLICATIONS

International Search Report issued in International Application No. PCT/CN2014/000101 mailed Sep. 30, 2014 (with translation).
Written Opinion of the International Searching Authority issued in International Application No. PCT/CN2014/000101 mailed Sep. 30, 2014 (with translation).

* cited by examiner

COMPREHENSIVE ADVANCED GEOLOGICAL DETECTION SYSTEM CARRIED ON TUNNEL BORING MACHINE

FIELD OF THE INVENTION

The present invention relates to a comprehensive advanced geological detection system carried on a tunnel boring machine, and particularly relates to a carrying device for a multifunctional combination main frame, a comprehensive interpretation and decision system and three kinds of detection devices.

BACKGROUND OF THE INVENTION

In a tunnel (hole) construction process, an internationally accepted tunnel boring machine construction method has the significant advantages of "high boring speed, low construction disturbance, high cavitation quality, high comprehensive economic and social benefits, construction safety and civilization and the like", which can not be matched by a drilling and blasting construction method. At present, 30-40% of tunnels are dug by tunnel boring machines every year in the world, the number of the tunnels dug by the tunnel boring machines exceeds 1,000, the accumulated boring length exceeds 5,000 kilograms, and some international departments also explicitly stipulate that tunnels (holes) of more than 3 km must be constructed by adopting the tunnel boring machines. The tunnel boring machine construction method is an irresistible trend and a leading choice of worldwide tunnel (hole) engineering construction.

The tunnel boring machine construction method has poor adaptability to the geological conditions of large stratum change amplitude, unfavorable geological development and the like. Since existing tunnel construction period advanced prediction instruments and technologies can not previously detect and preprocess unfavorable geological conditions, the risks of geological hazards such as water and mud outburst, landslide and large deformation in the tunnel boring machine construction are higher, tunnel boring machines are easily stuck, damaged and scrapped, and even major accidents of casualties happen. Accordingly, technical research and equipment development for quantitative advanced prediction of unfavorable geology in front of the tunnel face in a complex boring machine construction environment are urgently needed for tunnel construction safety in the boring machine construction.

For advanced geological prediction technologies and detection devices, the essential difference between the tunnel boring machine construction and the drilling and blasting method construction lies in that: (1) a tunnel boring machine is huge and occupies most space behind the tunnel face, and a common excitation shot point and a common receiving system for seismic wave advanced prediction can not be arranged on the side wall of a tunnel, so that seismic advanced prediction technologies of TSP (Tunnel Seismic Prediction, Swiss Amberg Measurement Technology Company), TRT (True Reflection Tomography, American NSA Engineering Company) and the like can not be applied; (2) the tunnel boring machine is provided with a large amount of metal members and power supply cables which may produce huge electromagnetic interference, so that the detection effects of a ground penetrating radar method, a time domain electromagnetic method and the like are extremely unsatisfactory; and (3) when the tunnel boring machine is used for construction, about two hours for overhauling is needed every day, at the moment, a cutter head of the tunnel boring machine retreats for 1-2 m, and this is a unique link for advanced geological prediction, but the space is narrow and the time is relatively short. In general, the advanced geological prediction in the tunnel boring machine construction environment faces the problems of "narrow observation space, complex electromagnetic environment and relatively short detection time".

At present, there are mainly a few technologies and instruments for advanced geological prediction of tunnel boring machine construction around the world as follows: (1) an advanced drill of the tunnel boring machine is utilized for boring, which has the defects that only the geological condition around a borehole can be disclosed, the geological condition within the whole range in front of the tunnel face can not be reflected, geological abnormal bodies are easily left out, and misinformation, misreporting and hidden hazards are caused; (2) a focusing induced polarization method BEAM (Bore-Tunneling Electrical Ahead Monitoring, German Geohydraulic Data Company) system is utilized, but the BEAM technology can only be used for qualitatively judging whether a water-containing body exists within a certain range in front of the tunnel face, the positioning precision of the BEAM technology is easily disturbed by the on-site environment, and the BEAM technology can not be used for estimating and predicting the water quantity; (3) a seismic reflection method ISIS (Integrated Seismic Imaging System, German GFZ Company) system is utilized, in view of the observation manner of the ISIS, a traditional VSP (Vertical Seismic Profiling) manner is adopted, then large-scale geological abnormal bodies such as faults can be detected, but the water-containing body can not be identified, and how to remove the vibration interference in the tunnel boring machine construction is a problem; and (4) a seismic softground probing SSP (Sonic Softground Probing, German Herrenknecht Company) system is a special seismic wave system for boulder probing in softground, and the probing distance generally does not exceed 40 m, so the application range of the system is limited. Moreover, the document HSP Sound Wave Reflection Method Geological Advanced Prediction of TBM Construction, the patent Device for Advanced Geological Prediction with Vibration Signals in TBM Method Construction and Using Method Thereof and the patent TBM Construction Tunnel Forward Three-Dimensional Induced Polarization Method Advanced Detection Device System and Method respectively referred to the technical schemes of carrying seismic wave and induced polarization detection devices on tunnel boring machines to carry out advanced geological detection, the adopted detection methods are simplex, and the application range and detection object of each detection method are different from those of the other one, so that various unfavorable geological conditions in front of the tunnel face can not be comprehensively and accurately detected and predicted.

Aiming at the complex environment of the tunnel boring machine construction, in order to detect unfavorable geological bodies such as faults, fractured rock masses and karsts in front of tunnel faces and quantitatively detect the position and quantity of underground water, it is impractical to singly adopt a certain geophysical method. Through investigation and empirical analysis of existing technologies, three following geophysical detection methods are needed for comprehensive detection and joint inversion interpretation, so as to reduce the multiplicity and improve the detection effect:

(1) a seismic wave advanced detection technology: the detection distance of this method is relatively far (more than 100 meters), and this method has a good effect of detecting potential water-containing structures of faults, karst caves, underground rivers and the like;

(2) an induced polarization method advanced detection technology: researches discover that, this method has a good effect of quantitatively predicting the water quantity and spatial position of a water-containing body; and (3) a borehole ground penetrating radar method advanced detection technology: according to this method, a borehole is drilled, a borehole radar antenna is transmitted to a borehole to implement detection, the resolution of a borehole ground penetrating radar is high, and the detection radius is relatively small, so that this method is applicable to fine detection of geological conditions in front of tunnel boring machine construction faces.

In general, the unfavorable geological advanced prediction technologies and instruments of the tunnel boring machine construction are still at the initial stage, and have the following main problems:

(1) the observation space in the tunnel boring machine construction environment is very narrow, and only a space of 1-2 meters between a cutter head and a tunnel face during overhauling can be utilized, so how the space is utilized for effective observation by the detection technologies of a seismic method, an electrical method, an electromagnetic method and the like is a problem;

(2) since the tunnel boring machine is a complex mechanical system and has relatively high requirements for integration and automation of advanced detection equipment, a carrying problem and an automation problem of advanced detection instruments need to be solved; and (3) since the cutter head needs to rotate to realize rock breaking and digging in the tunnel boring machine construction, the communication between an advanced detection instrument and an excitation/acquisition device arranged on the cutter head, how to avoid winding of electro-hydraulic supply pipelines in the rotating state of the cutter head and how to realize good wiring are problems.

SUMMARY OF THE INVENTION

The aim of the present invention is to provide a comprehensive advanced geological detection system carried on a tunnel boring machine for overcoming the above-mentioned defects of the prior art, which adopts the basic ideas: selecting a three-dimensional seismic method, an induced polarization method and a borehole ground penetrating radar method, and controlling the work and operation of a comprehensive advanced geological prediction system by using a multifunctional combination main frame as a control center; and boring the cutter head of a tunnel boring machine, installing induced polarization/seismic wave detection devices, installing a borehole ground penetrating radar detection device at the upper part of the tunnel boring machine, implementing inversion and interpretation on measurement data by using a remote data interpretation system, giving a prediction result and feeding back the prediction result to a tunnel boring machine control system, so as to support the work of the tunnel boring machine.

To realize the above-mentioned purposes, the present invention adopts the following technical schemes.

A comprehensive advanced geological detection system carried on a tunnel boring machine includes a multifunctional combination main frame, an induced polarization detection device and a seismic wave detection device on the cutter head, an integrated junction device for providing electro-hydraulic control signals to the detection devices in the cutter head, an oblique borehole ground penetrating radar detection device at the upper part of the tunnel boring machine, and a comprehensive interpretation and decision system.

The multifunctional combination main frame using a high-performance embedded system as a core mainly includes a time division multiplexing control module, an excitation source control module and a parallel data acquisition module. The time division multiplexing control module controls a trigger module through the excitation source control module to output trigger signals to the three detection devices respectively, and the three detection devices respectively send measurement data and feedback signals to the time division multiplexing control module through the parallel data acquisition module.

The high-performance embedded system of the multifunctional combination main frame selects two or three detection methods according to specific working conditions, and the time division multiplexing control module controls the excitation source control module and the parallel data acquisition module, so that detection is implemented according to a set time division multiplexing detection mode. In the specific implementation, when each detection unit carries out measurement, the acquisition interval of two data measuring points has certain waiting time, and data acquisition of the other detection unit is performed within the waiting time, so that detection of the detection units within different time periods in the whole detection process is realized, and the function of quasi-synchronous detection is achieved. The present invention realizes time division multiplexing quasi-synchronous detection of the two or three detection methods, so that the detection efficiency is greatly improved, the requirement for extremely short time of tunnel boring machine advanced detection is met, and the comprehensive geophysical detection under the construction condition of the boring machine becomes possible. The multifunctional combination main frame may transmit preprocessed data to the comprehensive interpretation and decision system, to realize remote monitoring, interpretation, decision and control, so that engineers may carry out related work without arriving at the site, and the working efficiency of a whole prediction system is greatly improved. The joint interpretation and decision system includes a geophysical inversion system, a three-dimensional virtual reality system, an interpretation and decision system, a comprehensive geophysical detection system and a tunnel boring machine management control system, wherein the comprehensive geophysical detection system acquires data from the tunnel boring machine and then transmits the data to the geophysical inversion system, the three-dimensional virtual reality system guides the tunnel boring machine to construct, the interpretation and decision system releases decision information to the tunnel boring machine management control system, and the tunnel boring machine management control system perfects a case database for the interpretation and decision system.

Inversion/migration imaging joint inversion of the three methods is the core of the comprehensive interpretation and decision system, and the comprehensive interpretation and decision system may output independent inversion results and joint inversion results of the three methods, so as to support geological interpretations and decisions. The three-dimensional virtual reality system for the geological condition in front of a tunnel face of the tunnel boring machine construction based on this may express the inversion results in the form of a three-dimensional entity and realize man-machine interaction and three-dimensional roaming, and a "geophysical data-geological information" interpretation database is constructed according to an established unfavorable geological body joint interpretation and identification module, so that the interpretation and decision system with an interaction function is realized, and a user may make an interpretation to geophysical data and make a decision to the geological results under the auxiliary support of the interpretation database. The decision system may report final decision information to the tunnel boring machine management control system, so as to support boring evaluation and safety analysis of the boring machine. Meanwhile, the decision system may also compare the digging disclosed practical situation with the prediction decision result, evaluate the advancement of detection indexes and store typical prediction cases into the database, so as to continually enrich and perfect the database.

The induced polarization detection device and the seismic wave detection device are arranged on the cutter head of the tunnel boring machine according to a certain law, which may simultaneously improve the detection precision of detection instruments and the rock breaking efficiency of the cutter head. A plurality of induced polarization detection device access holes and a plurality of seismic wave detection device access holes are reserved in the cutter head, wherein the induced polarization detection device access holes are distributed in a "*" shape, and the seismic wave detection device access holes are distributed in a "=" shape.

The induced polarization detection device and the seismic wave detection device are arranged in the cutter head, and a door capable of preventing chippings produced during rock-breaking advancement of the tunnel boring machine from plugging each access hole is arranged outside each detection device access hole in the cutter head. When the detection begins, the protective doors for the access holes are first opened, and the detection devices extend out of the access holes for certain lengths through telescopic rods and are tightly attached to the tunnel face, so that when the detection is finished, the detection devices completely retract to the access holes through the telescopic rods and the protective doors are closed.

Each of the induced polarization detection device and/or the seismic wave detection device includes a probe, a telescopic rod, a hydraulic system, a detection device body, a torque sensor, a high-pressure water conveying channel, a rock coupling material conveying pipeline and elastic ferrules; the hydraulic system, the detection device body, the telescopic rod and the probe are sequentially and fixedly connected with each other, and the torque sensor is arranged on the telescopic rod; the elastic ferrules capable of locking the telescopic rod are also arranged on the lateral surfaces of the detection device body or the telescopic rod, so that detection failure caused by axial displacement of the probe and the telescopic rod may be prevented, which is particularly important for seismic wave detection. By adopting the high-pressure water conveying pipeline and the rock coupling material conveying pipeline, high-pressure water may be jetted to clean the tunnel face and the probe, so as to ensure tight combination between the probe and the tunnel face; and a rock coupling material may be conveyed to the space between the tunnel face and the probe, so as to ensure good coupling between the probe and the tunnel face.

The integrated junction device includes a slip ring rotor body, an outer slip ring stator body, a conductive slip ring, an inner slip ring stator body, a hydraulic oil rotary joint and a fixed support. The integrated junction device is positioned at the joint between the tunnel boring machine cutter head and the tunnel boring machine body, the slip ring rotor body of a power supply device is fixedly connected with the cutter head, the outer slip ring stator body is fixedly connected with the tunnel boring machine body, the inner slip ring stator body is fixedly installed on the outer slip ring stator body, and the hydraulic oil rotary joint is connected to an oil passage hole at the rear end of the slip ring mover body. When the cutter head rotates relative to the tunnel boring machine body, an electrical control signal is transmitted to the detection device in the cutter head through the conductive slip ring at the outer ring of the integrated junction device, and hydraulic oil required by the hydraulic telescopic rod of the detection device is transmitted to the hydraulic system in the cutter head through the hydraulic oil rotary joint in the center of the integrated junction device. The integrated junction device effectively solves the problem that the system is damaged and may not work due to twisting of electrical control cables and hydraulic oil pipes between the detection device in the cutter head and the multifunctional combination main frame in the tunnel boring machine body when the cutter head rotates relative to the tunnel boring machine body, and the integrated junction device only needs a small installation space and is reliable in electrical and hydraulic oil passing performance.

The borehole ground penetrating radar detection device is connected with the tunnel boring machine shell through a ball joint, and utilizes a vertical and horizontal angle adjusting system, so that the included angle between a radar antenna telescopic rod and the axis of the tunnel boring machine can be actively adjusted, and the borehole ground penetrating radar detection device can be flexibly utilized. Both an advanced quick drill and the borehole ground penetrating radar antenna telescopic rod are installed on a same equipment base, and can be quickly and automatically switched to work alternately. A force/torque sensor is arranged on the borehole ground penetrating radar antenna telescopic rod, and may timely warn an operator and terminate the operation when a sleeve is deformed or the borehole ground penetrating radar antenna telescopic rod may not be elongated or retracted in the presence of a foreign matter, so as to prevent damaging the borehole ground penetrating radar antenna.

The borehole ground penetrating radar detection device includes an equipment access pipeline, a ball joint, an eccentric pipe-following drill bit, a borehole ground penetrating radar antenna, a carrying device support, a advanced quick drill, a borehole ground penetrating radar antenna telescopic rod, a vertical angle adjusting guide rail, a horizontal angle adjusting guide rail, a motor and gear transmission system, a equipment base, a base moving guide rail and a base moving guide wheel. The access to the eccentric pipe-following drill bit and the borehole ground penetrating radar antenna is realized through the equipment access pipeline, the borehole ground penetrating radar detection device is connected with the tunnel boring machine shell through the ball joint, and the vertical and horizontal angle adjusting guide rails and the motor and gear transmission system may actively adjust the included angle between the eccentric pipe-following drill bit or the radar antenna telescopic rod and the axis of the tunnel boring machine, so that the borehole ground penetrating radar detection device may be flexibly utilized.

The advanced quick drill and the borehole ground penetrating radar antenna telescopic rod are installed on the same equipment base, and the guide wheel moves horizontally along the guide rail, so that the corresponding equipment is aligned with the equipment access pipeline, and the advanced quick drill and the borehole ground penetrating radar antenna may be automatically switched to work alternately. The advanced quick drill utilizes the eccentric pipe-following drill bit, so that the sleeve may be driven at one time during drilling, to protect the borehole ground penetrating radar antenna; the drill bit may be extracted from the sleeve by appropriate reversal; and the borehole ground penetrating radar antenna is automatically transmitted through a multistage hydraulic telescopic rod.

The borehole ground penetrating radar antenna telescopic rod is the multistage hydraulic telescopic rod, the hydraulic transmission system supplies power to the multistage hydraulic telescopic rod, a force/torque sensor capable of detecting the force/torque conditions of the borehole ground penetrating radar antenna and the borehole ground penetrating radar antenna telescopic rod is installed at each of the head and tail of the multistage hydraulic telescopic rod, a camera and illumination device installed at the head of the radar antenna is protected by a streamline transparent protective cover, the condition in a borehole may be known in real time by using the camera and the force/torque sensors together, and when the sleeve is deformed or the radar antenna telescopic rod may not be elongated or retracted in the presence of a foreign matter, the operator is timely warned and the operation is terminated, so as to prevent damaging the radar antenna.

The present invention has the following beneficial effects:
(1) Aiming at the tunnel boring machine, the present invention provides the device with three advanced geological detection instruments carried on the tunnel boring machine, and the device mainly includes the induced polarization detection device, the seismic wave detection device and the borehole ground penetrating radar detection device and may quickly carry out advanced geological detection at the break of the tunnel boring machine, so that the efficiency and accuracy of the advanced geological detection of the tunnel boring machine are greatly improved.
(2) The multifunctional combination main frame of the present invention is provided with the time division multiplexing control module, two or three detection methods may be selected under the control of the main frame according to the specific working conditions, and the detection is implemented according to the set time division multiplexing mode, so that the detection time may be effectively reduced, and the detection efficiency may be improved. Meanwhile, the preprocessed data may be transmitted to the comprehensive interpretation and decision system, to realize remote monitoring, interpretation, decision and control, so that engineers may carry out related work without arriving at the site, and the working efficiency of the whole prediction system is greatly improved.
(3) The present invention proposes an arrangement manner of induced polarization and seismic wave detection units on the cutter head, so that the reformed cutter head does not affect the boring operation but may ensure the normal work of multiple detection devices. The force/torque sensors are installed on the telescopic rods of the three detection units to form a state feedback system, so that tight contact between the probe and the tunnel face may be ensured, and the probes and the telescopic rods are not damaged; and the high-pressure water conveying pipeline and the rock coupling material conveying pipeline are arranged in the telescopic rod, so that tight combination and good coupling between the probe and the tunnel face may be ensured.
(4) The integrated junction device is arranged between the cutter head and the tunnel boring machine body, and when the cutter head rotates relative to the tunnel boring machinebody, electro-hydraulic control signals may be transmitted to the detection and extension system in the cutter head through the integrated junction device, so that the problem that the system may be damaged and may not work due to twisting of electrical control cables and hydraulic oil pipes between the detection device in the cutter head and the multifunctional combination main frame is effectively solved; and the integrated junction device only needs a small installation space and is reliable in electrical and hydraulic oil passing performance.
(5) The borehole ground penetrating radar detection device utilized by the present invention is connected with the tunnel boring machine shell through the ball joint, and utilizes the vertical and horizontal angle adjusting system, so that the included angle between the eccentric pipe-following drill bit or the borehole ground penetrating radar antenna telescopic rod and the axis of the tunnel boring machine may be actively adjusted, and the borehole ground penetrating radar detection device may be flexibly utilized; and the advanced quick drill and the radar antenna telescopic rod are installed on the same equipment base, so that the advanced quick drill and the borehole ground penetrating radar may be automatically switched to work alternately.

Figure 1:
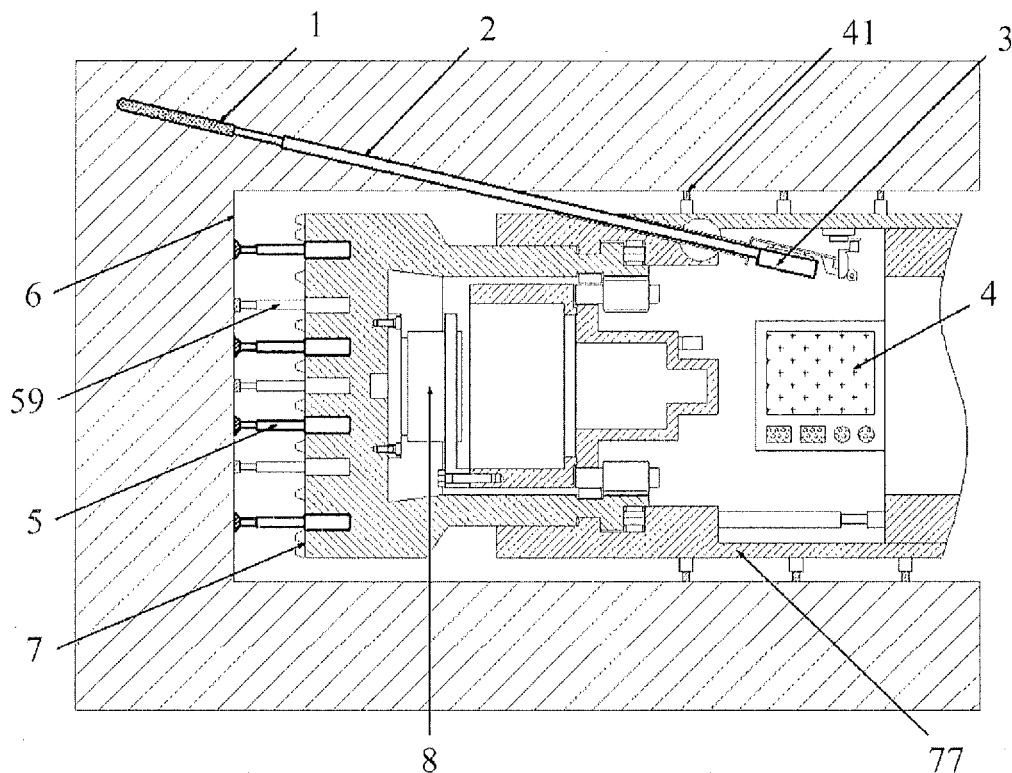
FIG. 1 is an overall sectional diagram of a comprehensive advanced geological detection system carried on a tunnel boring machine.

In the drawings: 1, borehole ground penetrating radar antenna; 2, borehole ground penetrating radar antenna telescopic rod; 3, borehole ground penetrating radar detection device; 4, multifunctional combination main frame; 5, induced polarization detection device; 6, tunnel face; 7, cutter head; 8, integrated junction device; 9, induced polarization detection device access hole; 10, seismic wave detection device access hole; 11, induced polarization/seismic wave probe; 12, high-pressure water conveying pipeline; 13, hydraulic cylinder; 14, detection device telescopic rod; 15, rock coupling material conveying pipeline; 16, hydraulic elastic ferrule; 17, detection device body; 18, force/torque sensor; 19, slip ring rotor body; 20, outer slip ring stator body; 21, conductive slip ring; 22, inner slip ring stator body; 23, hydraulic oil rotary joint; 24, tunnel boring machine body; 25, equipment access pipeline; 26, ball joint; 27, eccentric pipe-following drill bit; 28, carrying device support; 29, advanced quick drill; 30, hydraulic transmission system; 31, vertical angle adjusting guide rail; 32, horizontal angle adjusting guide rail; 33, motor and gear transmission system; 34, equipment base; 35, guide rail; 36, guide wheel; 37, transparent protective cover; 38, camera and illumination device; 39, force/torque sensor; 40, induced polarization detection electrode; 41, seismic wave detector; 42, seismic wave detection exciter; 43, borehole ground penetrating radar; 44, multi-channel adjustable high-constant-current power supply device; 45, induced polarization multi-channel measuring device; 46, seismic wave detection exciter exciting device; 47, seismic wave detector multi-channel measuring device; 48, radar electromagnetic wave transmitting device; 49, radar electromagnetic wave receiving and acquisition device; 50, power supply control module; 51, induced polarization measurement control module; 52, excitation control module; 53, seismic wave measurement control module; 54, radar electromagnetic wave generating control module; 55, radar electromagnetic wave receiving control module; 56, excitation source control module; 57, time division multiplexing control module; 58, parallel data acquisition module; 59, seismic wave detection device; 60, comprehensive interpretation and decision system; 61, hydraulic control signal; 62, electrical control signal; 63, measurement data and feedback signal; 64, geophysical inversion system; 65, three-dimensional virtual reality system; 66, interpretation and decision system; 67, comprehensive geophysical detection system; 68, tunnel boring machine; 69, tunnel boring machine management control system; 70, data transmission; 71, construction guiding; 72, case database; 73, decision information release; 74, data acquisition; 75, digging feedback; 76, digging disclosure; and 77, tunnel boring machine shell.

DETAILED DESCRIPTION OF THE EMBODIMENTS

The present invention will be further described below through specific examples and accompanying drawings. It should be pointed out that, merely a preferred embodiment of the present invention will be disclosed below, and certainly, may not be used for limiting the scope of the present invention. Various improvements and modifications may also be made for those skilled in the art without departing from the principle of the present invention, and these improvements and modifications should be regarded within the protection scope of the present invention.

FIG. 1 is an overall sectional diagram of a comprehensive advanced geological detection system carried on a tunnel boring machine 68. The comprehensive advanced geological detection system carried on the tunnel boring machine 68 mainly includes four parts, respectively a multifunctional combination main frame 4, an induced polarization detection device 5 and a seismic wave detection device 59 on the cutter head 7, an integrated junction device 8 for providing control signals and hydraulic oil to the induced polarization detection device 5 and the seismic wave detection device 59 and an oblique borehole ground penetrating radar detection device 3 at the upper part of the tunnel boring machine 68, wherein the borehole ground penetrating radar detection device 3 mainly includes a borehole ground penetrating radar antenna 1, a borehole ground penetrating radar antenna telescopic rod 2, an advanced quick drill 29 and the like. A seismic wave detector 41 is installed on a tunnel boring machine shell 77 and used for receiving seismic wave returned from the wall of a tunnel.

Figure 2:
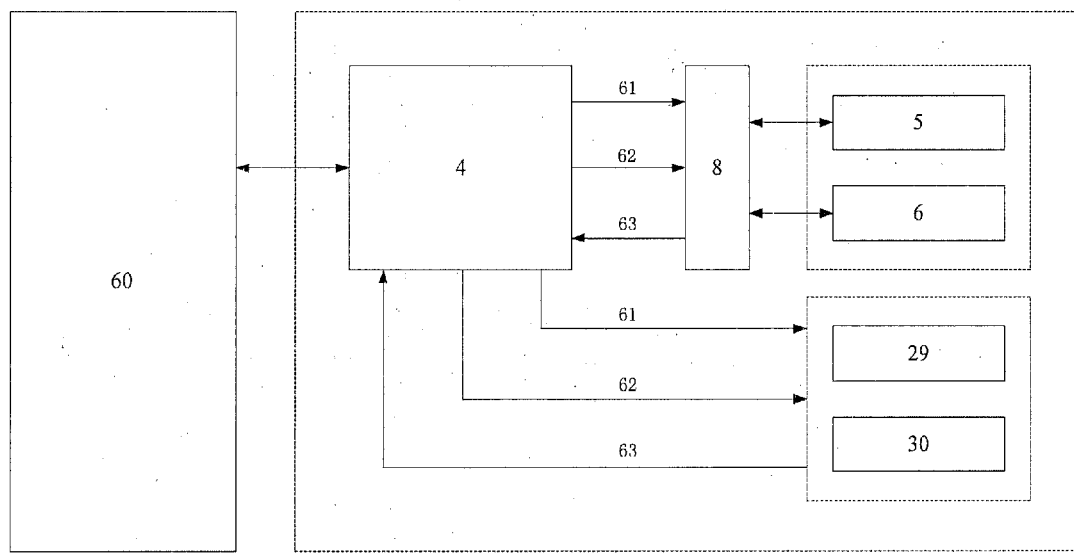
FIG. 2 is a structural diagram of the comprehensive advanced geological detection system.

FIG. 2 is a structural diagram of the comprehensive advanced geological detection system. The multifunctional combination main frame 4 outputs a hydraulic control signal 61 and an electrical control signal 62 to the induced polarization detection device 5, the seismic wave detection device 59 and the borehole ground penetrating radar detection device 3, the induced polarization detection device 5, the seismic wave detection device 59 and the borehole ground penetrating radar detection device 3 output measurement data and feedback signals 63 to the multifunctional combination main frame 4, and the multifunctional combination main frame 4 may communicate with the comprehensive interpretation and decision system 60 in a wired or wireless manner. Both the induced polarization detection device 5 and the seismic wave detection device 59 are positioned in the cutter head 7 of the tunnel boring machine 68, both the advanced quick drill 29 and the borehole ground penetrating radar antenna telescopic rod 2 are positioned below the tunnel boring machine shell 77, electro-hydraulic signals need to be transferred through the integrated junction device 8 when the multifunctional combination main frame 4 communicates with the induced polarization detection device 5 and the seismic wave detection device 59 in the cutter head 7, and the multifunctional combination main frame 4, the integrated junction device 8, the induced polarization detection device 5, the seismic wave detection device 42 and the borehole ground penetrating radar detection device 3 are all installed on the tunnel boring machine 68.

Figure 3:
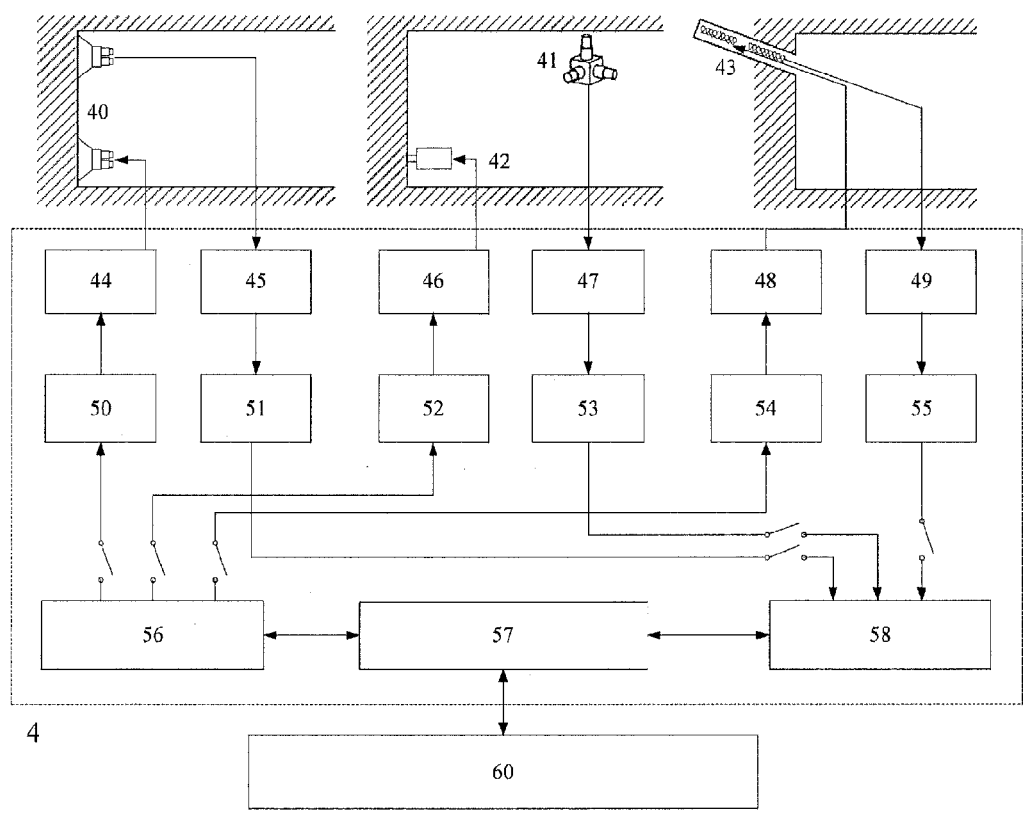
FIG. 3 is a structural diagram of a multifunctional combination main frame.

FIG. 3 is a structural diagram of the multifunctional combination main frame. The multifunctional combination main frame 4 using a high-performance embedded system as a core mainly includes a multi-channel adjustable high-constant-current power supply device 44, an induced polarization multi-channel measuring device 45, a seismic wave detection exciter exciting device 46, a seismic wave detector multi-channel measuring device 47, a radar electromagnetic wave transmitting device 48, a radar electromagnetic wave receiving and acquisition device 49, a power supply control module 50, an induced polarization measurement control module 51, an excitation control module 52, a seismic wave measurement control module 53, a radar electromagnetic wave generating control module 54, a radar electromagnetic wave receiving control module 55, an excitation source control module 56, a time division multiplexing control module 57 and a parallel data acquisition module 58.

The excitation source control module 56 mainly realizes communication and control between the time division multiplexing control module 57 and each of the power supply control module 50, the excitation control module 52 and the radar electromagnetic wave transmitting control module 54. The time division multiplexing control module 57 sends a parallel control command to the excitation source control module 56, and then the excitation source control module 56 sends related commands to the corresponding control modules, so as to control the power supply control module 50, the excitation control module 52 and the radar electromagnetic wave transmitting control module 54. The power supply control module 50 controls the multi-channel adjustable high-constant-current power supply device 44 to provide a constant-high-current output for induced polarization detection electrodes 40; the excitation control module 52 controls the seismic wave detection exciter exciting device 46 to provide an exciting signal for a seismic wave detection exciter 42; and the radar electromagnetic wave transmitting control module 54 controls the radar electromagnetic wave transmitting device 48 to provide an electromagnetic wave transmitting signal for a borehole ground penetrating radar 43.

Quasi-synchronous detection of an induced polarization method, a seismic wave method and a borehole ground penetrating radar method is realized in a time division multiplexing manner. The high-performance embedded system selects two or three detection methods according to specific working conditions, and the time division multiplexing control module 57 controls the excitation source control module 56 and the parallel data acquisition module 58, so that detection is implemented according to a set time division multiplexing detection mode. In the specific implementation, when each detection unit carries out measurement, the acquisition interval of two data measuring points has certain waiting time, the waiting time depends on the switching time of mechanical action between measuring points, and the system carries out data acquisition of the other detection unit within the waiting time, namely carries out data acquisition of the other detection unit at the interval of data acquisition of one detection unit, so that detection of the detection units within different time periods in the whole detection process is realized, and the function of quasi-synchronous detection is achieved. The time division multiplexing quasi-synchronous detection of the two or three detection methods may be realized, and theoretically, the three methods adopt the time division multiplexing manner, so that about ⅔ of time may be saved, the detection efficiency is greatly improved, the requirement for extremely short time of advanced detection of the tunnel boring machine 68 is met, and the comprehensive geophysical detection under the construction condition of the boring machine becomes possible. The multifunctional combination main frame 4 may be connected to the Internet in a wired or wireless manner and transmit preprocessed data acquired by multiple detection methods, multi-sensor data and control information to the comprehensive interpretation and decision system 60, to realize remote monitoring, interpretation, decision and control, so that engineers may carry out related work without arriving at the site, and the working efficiency of the whole detection system is greatly improved.

After all the detection units finish detection, the time division multiplexing control module 57 sends a parallel acquisition command to the parallel data acquisition module 58, to complete high-speed acquisition functions of the induced polarization measurement control module 51, the seismic wave measurement control module 53 and the radar electromagnetic wave receiving control module 55. Under the control of the induced polarization measurement control module 51, the induced polarization multi-channel measuring device 45 acquires data of the induced polarization detection electrode 40; under the control of the seismic wave measurement control module 53, the seismic wave detector multi-channel measuring device 47 acquires data of the seismic wave detector 41; and under the control of the radar electromagnetic wave receiving control module 55, the radar electromagnetic wave receiving and acquisition device 49 acquires data of the borehole ground penetrating radar 43.

Figure 4:
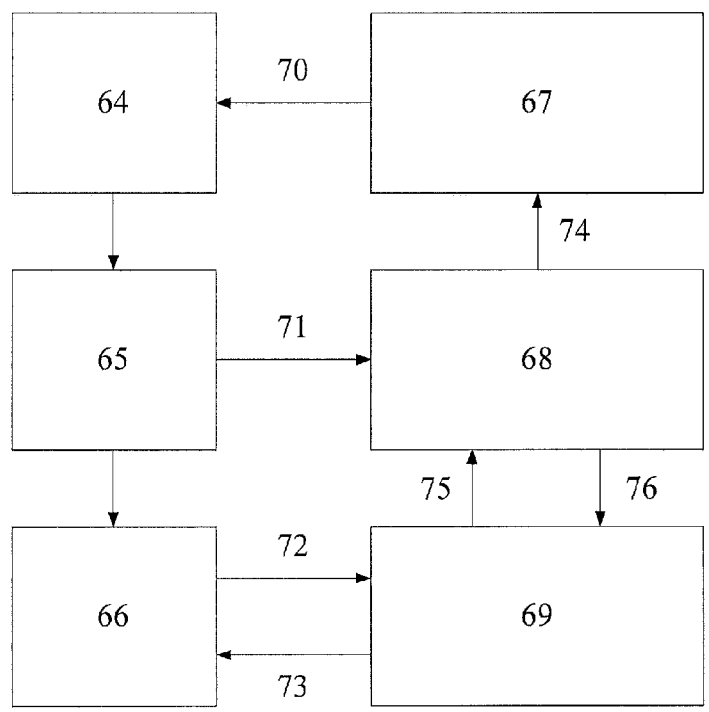
FIG. 4 is a schematic diagram of a comprehensive interpretation and decision system.

FIG. 4 is a schematic diagram of the comprehensive interpretation and decision system 60. An inversion system is used as a core and integrated with a virtual reality system and an interpretation and decision system to form the interpretation and decision system for quantitative advanced prediction of unfavorable geology construction of tunnel boring machine 68. A comprehensive geophysical detection system 67 acquires data from the tunnel boring machine 68 and transmits the data to a geophysical inversion system 64, a three-dimensional virtual reality system 65 guides the tunnel boring machine 68 to construct, an interpretation and decision system 66 releases decision information to a tunnel boring machine management control system 69, and the tunnel boring machine management control system 69 perfects a case database for the interpretation and decision system 66. The inversion/migration imaging joint inversion program of the three methods is the core of the comprehensive interpretation and decision system 60, and the comprehensive interpretation and decision system 60 may output independent inversion results and joint inversion results of the three methods, so as to support geological interpretations and decisions.

The three-dimensional virtual reality system 65 for the geological condition in front of the tunnel face of the tunnel boring machine 68 construction based on this may express the inversion results in the form of a three-dimensional entity and realize man-machine interaction and three-dimensional roaming, and a "geophysical data-geological information" interpretation database is constructed according to an established unfavorable geological body joint interpretation and identification module, so that the interpretation and decision system 66 with an interaction function is realized, and a user may make an interpretation to geophysical data and make a decision to the geological results under the auxiliary support of the interpretation database. The decision system is designed with an interface connected with the tunnel boring machine management control system 69, and reports final decision information to the tunnel boring machine management control system 69, so as to support boring evaluation and safety analysis of the boring machine. Meanwhile, the decision system may also compare the digging disclosed practical situation with the prediction decision result, evaluate the advancement of detection indexes and store typical prediction cases into the database, so as to continually enrich and perfect the database.

Figure 5:
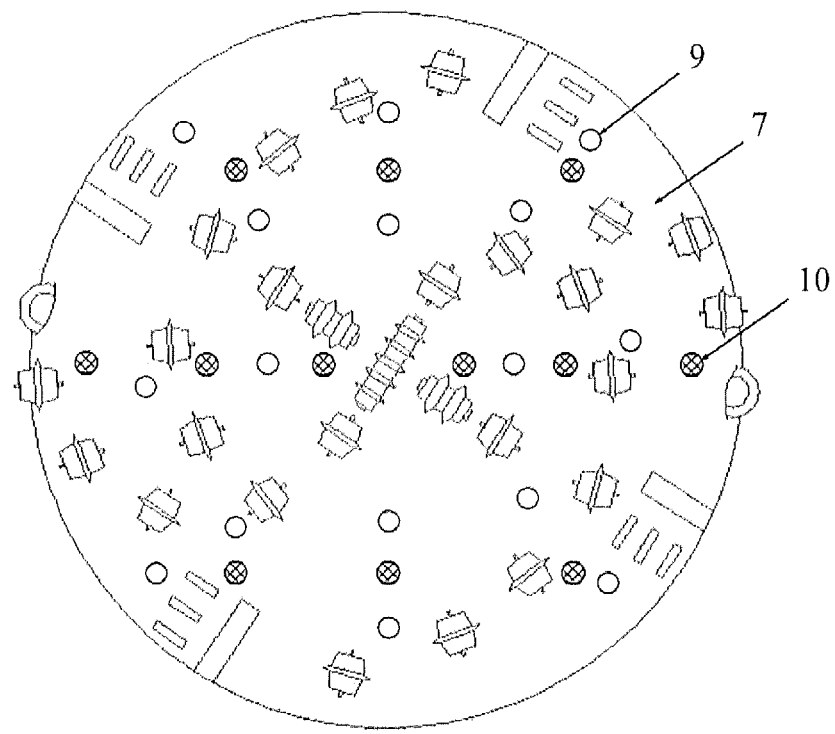
FIG. 5 is a comprehensive arrangement schematic diagram of advanced geological detection devices on the cutter head of the tunnel boring machine.

FIG. 5 is a comprehensive arrangement schematic diagram of advanced geological detection devices on the cutter head 7. The induced polarization detection device 5 and the seismic wave detection device 59 are arranged on the cutter head 7 according to a certain law, which may simultaneously improve the detection precision of detection instruments and the rock breaking efficiency of the cutter head, wherein the induced polarization detection device 5 is distributed in a "*" shape, the seismic wave detection device 59 is distributed in a "=" shape, certainly, this is just one distribution manner, and the induced polarization detection device 5 and the seismic wave detection device 59 may also be distributed in multiple other manners. In a specific implementation scheme, a plurality of induced polarization detection device access holes 9 and a plurality of seismic wave detection device access holes 10 are reserved in the cutter head 7, the induced polarization detection device 5 and the seismic wave detection device 59 are completely placed in the cutter head 7, and a door capable of preventing chippings produced during rock-breaking advancement of the tunnel boring machine from plugging each access hole is arranged outside each access hole; and when the detection begins, the protective doors for the access holes are first opened, and the induced polarization detection device 5 and the seismic wave detection device 59 extend out of the access holes for certain lengths through detection device telescopic rods 14 and are tightly attached to the tunnel face, so that when the detection is finished, the detection devices completely retract to the access holes through the telescopic rods and the protective doors are closed.

Figure 6:
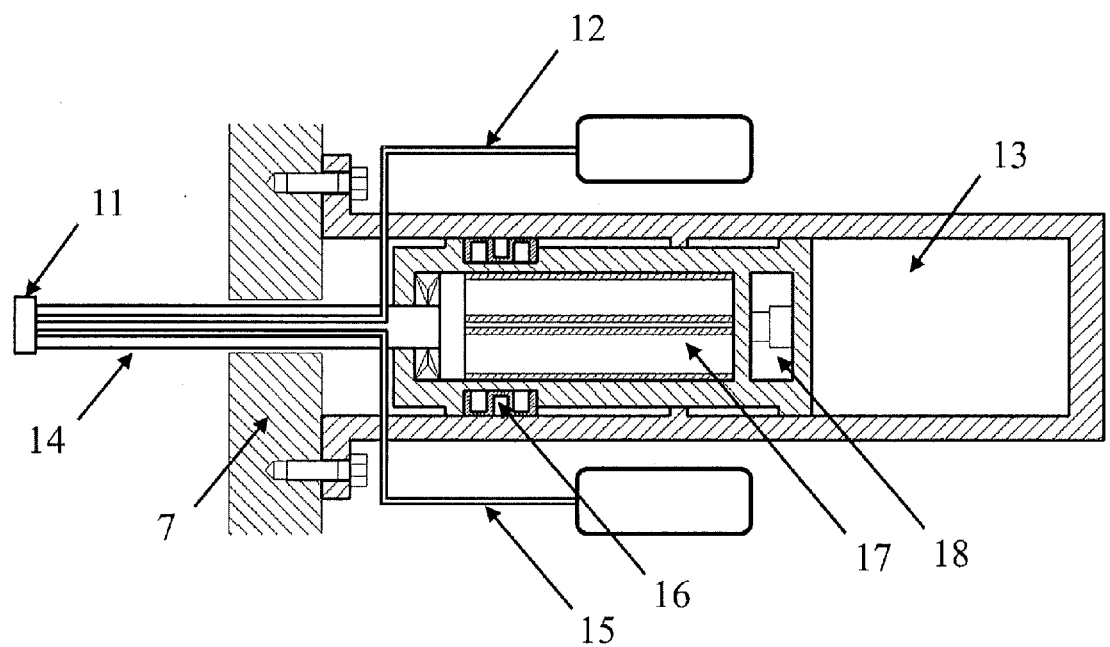
FIG. 6 is a sectional diagram of a detection device in the cutter head of the tunnel boring machine.

FIG. 6 is a sectional diagram of a detection device in the cutter head 7. The detection device mainly includes an induced polarization/seismic wave probe 11, a high-pressure water conveying pipeline 12, a hydraulic cylinder 13, a detection device telescopic rod 14, a rock coupling material conveying pipeline 15, hydraulic elastic ferrules 16, a detection device body 17 and a force/torque sensor 18. When the tunnel boring machine 68 suspends boring and starts detecting, the protective doors for the access holes are opened, hydraulic oil is injected, into the hydraulic cylinder 13 to ensure that the induced polarization/seismic wave probe 11, the detection device telescopic rod 14 and the detection device body 17 extend out of the access holes, and the force/torque sensor 18 is arranged in the telescopic rod of two detection manners; after the probe is in contact with the tunnel face, the value of the force/torque sensor 18 is increased along with extension of the detection device telescopic rod 14, and when the value is greater than a value set according to the local geological condition, the multi-functional combination main frame 4 would immediately stop the action of the hydraulic system, so that tight contact between the probe and the tunnel face may be ensured and the probe and the telescopic rod could not be damaged; meanwhile, the detection device telescopic rod 14 is locked by the hydraulic elastic ferrules 16, so that detection failure caused by axial displacement of the probe and the telescopic rod may be prevented, which is particularly important for seismic wave detection; and after the detection task is completed, the hydraulic elastic ferrules 16 are unlocked, the hydraulic oil is extracted from the hydraulic cylinder 13, the related devices are retracted to the access holes and the protective doors are closed. The inner part of the detection device telescopic rod 14 is hollow, and the high-pressure water conveying pipeline 12 and the rock coupling material conveying pipeline 15 are arranged in the detection device telescopic rod 14; when the force/torque sensor 18 learns that the probe is just in contact with the tunnel face, high-pressure water is jetted to the tunnel face through the high-pressure water conveying pipeline 12 and a matched pressurization device to clean loose impurities on the surface of the tunnel face and the probe, so that tight combination between the probe and the tunnel face is ensured; and when the probe continuously extends to be in tight contact with the tunnel face, a coupling material is conveyed to the space between the tunnel face and the probe through the rock coupling material conveying pipeline 15 and a matched conveying device, so that good coupling between the probe and the tunnel face is ensured.

Figure 7:
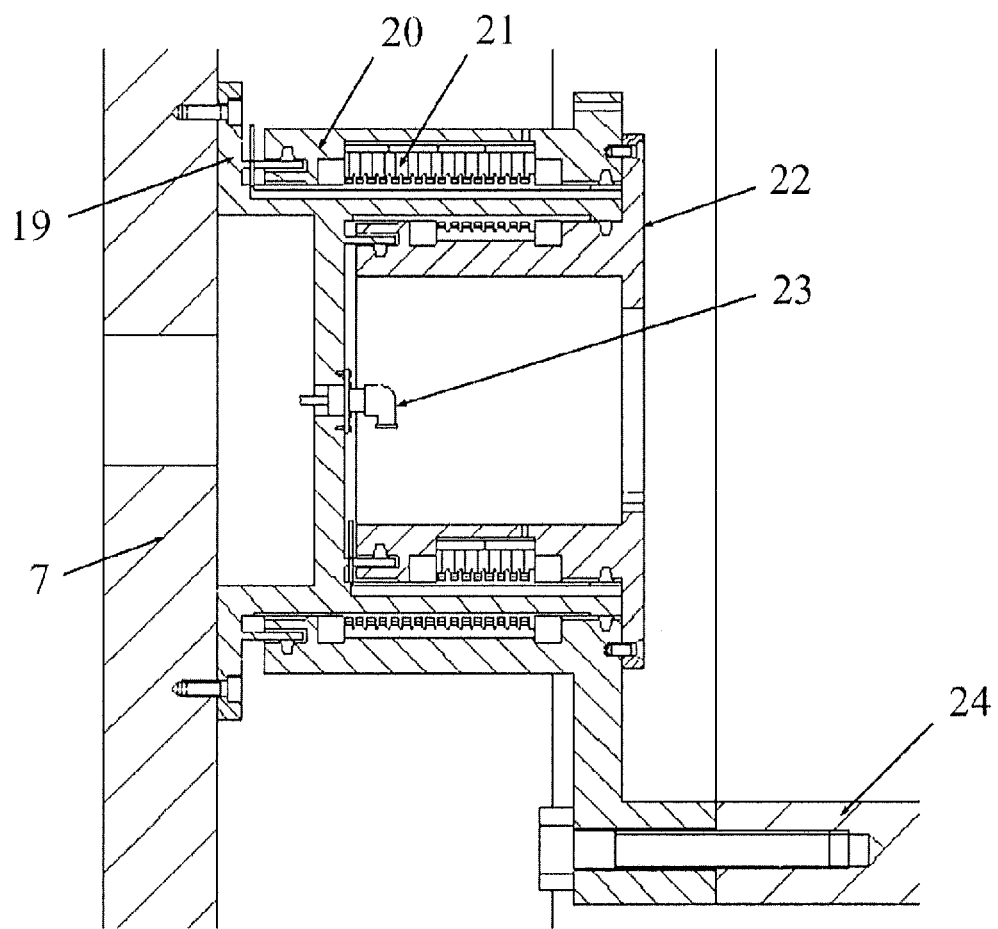
FIG. 7 is a sectional diagram of an integrated junction device.

FIG. 7 is a sectional diagram of the integrated junction device, which mainly includes a slip ring rotor body 19, an outer slip ring stator body 20, a conductive slip ring 21, an inner slip ring stator body 22, a hydraulic oil rotary joint 23 and a fixed support 24.

The integrated junction device 8 is positioned at the joint between the cutter head 7 and the tunnel boring machine body 24, the slip ring rotor body 19 of the power supply device is fixedly connected with the cutter head 7 through screws, the outer slip ring stator body 20 is fixedly connected with the tunnel boring machine body 24 through screws, the inner slip ring stator body 22 is fixedly installed on the outer slip ring stator body 20 through screws, and the hydraulic oil rotary joint 23 is connected to an oil passage hole at the rear end of the slip ring rotor body 19 through a flange plate of the mandrel. When the cutter head 7 rotates relative to the tunnel boring machine body, a control signal is transmitted to the detection device in the cutter head 7 through the conductive slip ring 21 at the outer ring of the integrated junction device, and hydraulic oil required by the detection device telescopic rod 14 is transmitted to the hydraulic system in the cutter head 7 through the hydraulic oil rotary joint 23 in the center of the integrated junction device. The integrated junction device effectively solves the problem that the system may be damaged and may not work due to twisting of electrical control cables and hydraulic oil pipes between the detection device in the cutter head 7 and the multifunctional combination main frame 4 when the cutter head 7 rotates relative to the tunnel boring machine body, and the integrated junction device needs a small installation space and is reliable in electrical and hydraulic oil passing performance.

Figure 8:
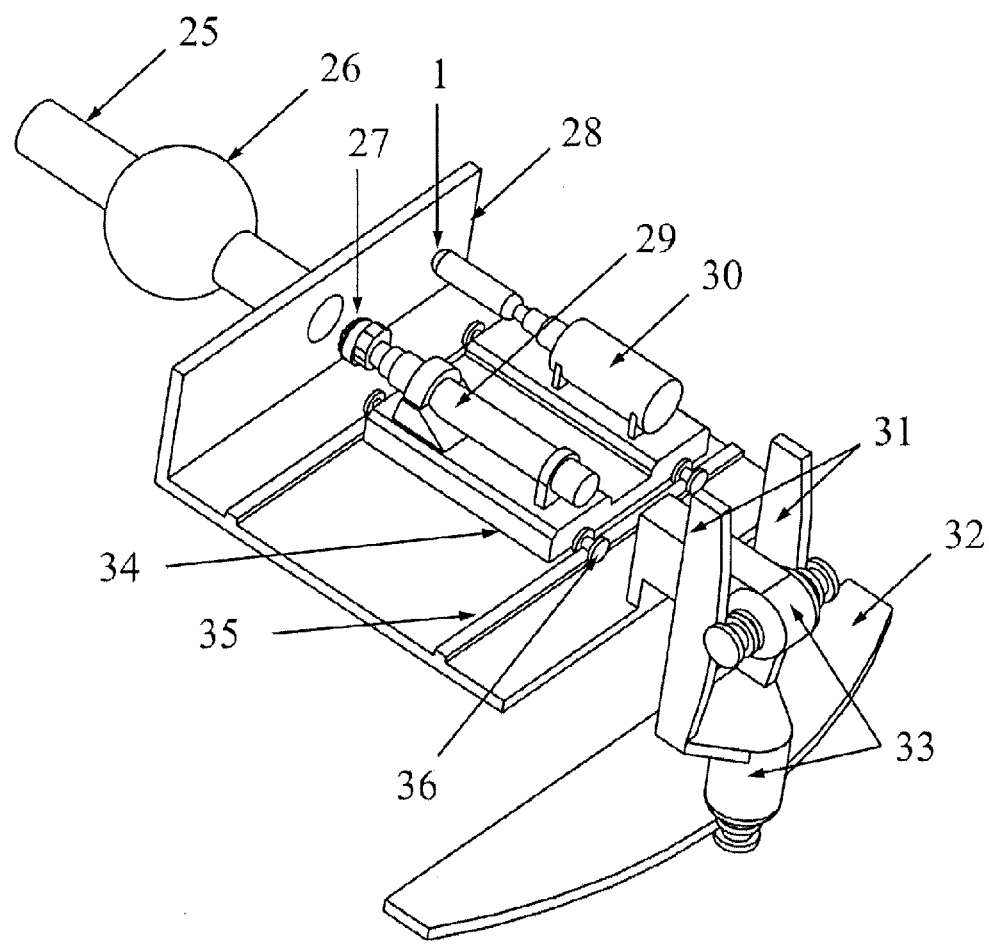
FIG. 8 is a schematic diagram of a borehole ground penetrating radar detection device.

FIG. 8 is a schematic diagram of the borehole ground penetrating radar detection device 3, which includes an equipment access pipeline 25, a ball joint 26, an eccentric pipe-following drill bit 27, a borehole ground penetrating radar antenna 1, a carrying device support 28, an advanced quick drill 29, a borehole ground penetrating radar antenna telescopic rod 2, a vertical angle adjusting guide rail 31, a horizontal angle adjusting guide rail 32, a motor and gear transmission system 33, an equipment base 34, a base moving guide rail 35 and a base moving guide wheel 36. The access to the eccentric pipe-following drill bit 27 and the borehole ground penetrating radar antenna 1 is realized through the equipment access pipeline 25, the borehole ground penetrating radar detection device 3 is connected with the tunnel boring machine shell 77 through the ball joint 26, and the included angle between the eccentric pipe-following drill bit 27 or the borehole ground penetrating radar antenna telescopic rod 2 and the axis of the tunnel boring machine 68 may be actively adjusted by using the vertical and horizontal angle adjusting guide rails and the motor and gear, transmission system, so that the borehole ground penetrating radar detection device 3 may be flexibly utilized. The advanced quick drill 29 and the borehole ground penetrating radar antenna telescopic rod 2 are installed on the same equipment base 34, and the guide wheel 36 moves horizontally along the guide rail 35, so that the corresponding equipment is aligned with the equipment access pipeline, and the advanced quick drill 29 and the borehole ground penetrating radar antenna 1 may be automatically switched to work alternately. The advanced quick drill 29 utilizes the eccentric pipe-following drill bit 27, so that a sleeve may be driven at one time during drilling, to protect the borehole ground penetrating radar antenna 1; the drill bit may be extracted from the sleeve by appropriate reversal; and the borehole ground penetrating radar antenna 1 is automatically transmitted through the borehole ground penetrating radar antenna telescopic rod 2. After the borehole ground penetrating radar detection device access holes are reserved in the cutter head 7, the borehole ground penetrating radar detection device 3 may also be installed on the cutter head 7 for forward detection.

Figure 9:
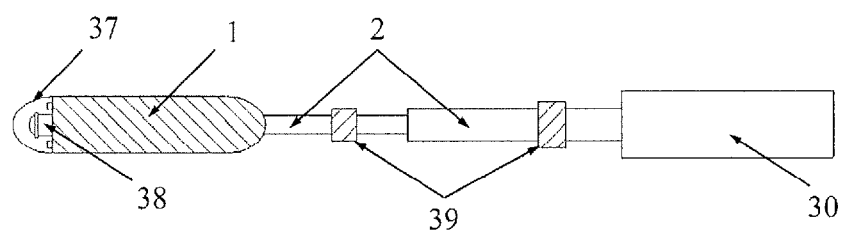
FIG. 9 is a schematic diagram of a borehole ground penetrating radar antenna telescopic rod.

FIG. 9 is a schematic diagram of the borehole ground penetrating radar antenna telescopic rod, wherein the hydraulic transmission system 30 provides power for the borehole ground penetrating radar antenna telescopic rod 2, a force/torque sensor 39 capable of detecting the force/torque conditions of the borehole ground penetrating radar antenna 1 and the borehole ground penetrating radar antenna telescopic rod 2 is arranged at each of the head and tail of the borehole ground penetrating radars antenna telescopic rod 2, a camera and illumination device 38 installed at the head of the radar antenna is protected by a streamline transparent protective cover 37, the condition in a borehole may be known in real time by using the camera 38 and the force/torque sensors 39 together, and when the sleeve is deformed or the borehole ground penetrating radar antenna telescopic rod 2 may not be elongated or retracted in the presence of a foreign matter, an operator is timely warned and the operation is terminated, so as to prevent damaging the borehole ground penetrating radar antenna 1.

The invention claimed is:

1. A comprehensive advanced geological detection system carried on a tunnel boring machine having an upper part, comprising:
   a multifunctional combination main frame,
   an induced polarization detection device and a seismic wave detection device on a cutter head,
   an integrated junction device for providing electro-hydraulic control signals to the induced polarization detection device and the seismic wave detection device in the cutter head,
   an oblique borehole ground penetrating radar detection device at the upper part of the tunnel boring machine, and
   a comprehensive interpretation and decision system; wherein:
   the multifunctional combination main frame comprises a time division multiplexing control module, an excitation source control module and a parallel data acquisition module; trigger signals are output to the induced polarization detection device, the seismic wave detection device, and the oblique borehole ground penetrating radar detection device through the excitation source control module respectively, and the three detection devices respectively send measurement data and feedback signals to the time division multiplexing control module through the parallel data acquisition module; and
   the comprehensive interpretation and decision system is configured to output independent inversion results and joint inversion results of an induced polarization detection method, a seismic wave detection method and a borehole ground penetrating radar detection method, through inversion/migration imaging joint inversion of the induced polarization detection method, the seismic wave detection method and the borehole ground penetrating radar detection method, so as to support geological interpretations and decisions.

2. The comprehensive advanced geological detection system carried on the tunnel boring machine of claim 1, wherein the time division multiplexing control module selects two or three detection methods of the induced polarization detection method, the seismic wave detection method and the borehole ground penetrating radar detection method, and the time division multiplexing control module controls the excitation source control module and the parallel data acquisition module, so that detection is implemented according to a time division multiplexing detection mode; in a specific implementation of the time division multiplexing detection mode, when each of the induced polarization detection device, the seismic wave detection device, and the oblique borehole ground penetrating radar detection device carries out measurement, an acquisition interval of two data measuring points has a waiting time, and data acquisition of the other detection devices of the induced polarization detection device, the seismic wave detection device, and the oblique borehole ground penetrating radar detection device is performed within the waiting time, so that detection of the induced polarization detection device, the seismic wave detection device, and the oblique borehole ground penetrating radar detection device within different time periods in an entire detection process is realized, and quasi-synchronous detection is achieved.

3. The comprehensive advanced geological detection system carried on the tunnel boring machine of claim 1, wherein the joint interpretation and decision system comprises a geophysical inversion system, a three-dimensional virtual reality system, an interpretation and decision system, a comprehensive geophysical detection system and a tunnel boring machine management control system, wherein the comprehensive geophysical detection system acquires data from the tunnel boring machine and then transmits the data to the geophysical inversion system, the three-dimensional virtual reality system guides the tunnel boring machine, the interpretation and decision system releases decision information to the tunnel boring machine management control system, and the tunnel boring machine management control system perfects a case database for the interpretation and decision system.

4. The comprehensive advanced geological detection system carried on the tunnel boring machine of claim 1, wherein a plurality of induced polarization detection device access holes and a plurality of seismic wave detection device access holes are reserved in the cutter head, wherein the induced polarization detection device access holes are distributed in a "*" shape, and the seismic wave detection device access holes are distributed in a "=" shape.

5. The comprehensive advanced geological detection system carried on the tunnel boring machine of claim 4, wherein the induced polarization detection device and the seismic wave detection device are arranged in the cutter head, the device access holes are formed in the cutter head, and a door is arranged outside each device access hole.

6. The comprehensive advanced geological detection system carried on the tunnel boring machine of claim 1, wherein each of the induced polarization detection device and the seismic wave detection device comprises a probe, a telescopic rod, a hydraulic system, a detection device body, a torque sensor, a high-pressure water conveying channel, a rock coupling material conveying pipeline and elastic ferrules; the hydraulic system, the detection device body, the telescopic rod and the probe are sequentially and fixedly connected with each other, and the torque sensor is arranged on the telescopic rod; the elastic ferrules are configured to lock the telescopic rod and are arranged on lateral surfaces of the detection device body or the telescopic rod; and by adopting the high-pressure water conveying channel and the rock coupling material conveying pipeline, high-pressure water is jetted to clean a tunnel face and the probe, and a rock coupling material is conveyed to a space between the tunnel face and the probe.

7. The comprehensive advanced geological detection system carried on the tunnel boring machine of claim 1, wherein the integrated junction device comprises a slip ring rotor body, an outer slip ring stator body, a conductive slip ring, an inner slip ring stator body, a hydraulic oil rotary joint and a fixed support; the integrated junction device is positioned at a joint between the tunnel boring machine cutter head and a tunnel boring machine body, the slip ring rotor body of a power supply device is fixedly connected with the cutter head, the outer slip ring stator body is fixedly connected with the tunnel boring machine body, the inner slip ring stator body is fixedly installed on the outer slip ring stator body, and the hydraulic oil rotary joint is connected to an oil passage hole at a rear end of the slip ring rotor body.

8. The comprehensive advanced geological detection system carried on the tunnel boring machine of claim 1, wherein the borehole ground penetrating radar detection device comprises an equipment access pipeline, a ball joint, an eccentric pipe-following drill bit, a borehole ground penetrating radar antenna, a carrying device support, an advanced quick drill, a borehole ground penetrating radar antenna telescopic rod, a vertical angle adjusting guide rail, a horizontal angle adjusting guide rail, a motor and gear transmission system, an equipment base, a base moving guide rail and a base moving guide wheel; access to the eccentric pipe-following drill bit and the borehole ground penetrating radar antenna is realized through the equipment access pipeline, the borehole ground penetrating radar detection device is connected with the tunnel boring machine shell through the ball joint, and the vertical and horizontal angle adjusting guide rails and the motor and gear transmission system adjust an included angle between the eccentric pipe-following drill bit or the radar antenna telescopic rod and an axis of the tunnel boring machine.

9. The comprehensive advanced geological detection system carried on the tunnel boring machine of claim 8, wherein the borehole ground penetrating radar antenna telescopic rod is a multistage hydraulic telescopic rod, a hydraulic transmission system supplies power to the multistage hydraulic telescopic rod, and a force/torque sensor for detecting force/torque conditions of the borehole ground penetrating radar antenna and the borehole ground penetrating radar antenna telescopic rod is installed at each of a head and a tail of the multistage hydraulic telescopic rod.

10. The comprehensive advanced geological detection system carried on the tunnel boring machine of claim 8, wherein the borehole ground penetrating radar detection device further comprises a streamline transparent protective cover, for protecting a camera and illumination device installed at a head of the radar antenna.

\* \* \* \* \*